United States Patent
Mutschler et al.

(10) Patent No.: US 6,820,511 B2
(45) Date of Patent: Nov. 23, 2004

(54) APPARATUS FOR MEASURING ROTATIONAL ANGLES

(75) Inventors: Reinhold Mutschler, Villingen-Schwenningen (DE); Juergen Schill, Bad Duerrheim (DE)

(73) Assignee: Stegmann GmbH & Co. KG, Donaueschingen (DE)

(*) Notice: Subject to any disclaimer, the term of this patent is extended or adjusted under 35 U.S.C. 154(b) by 0 days.

(21) Appl. No.: 10/412,717

(22) Filed: Apr. 11, 2003

(65) Prior Publication Data

US 2004/0079177 A1 Apr. 29, 2004

(30) Foreign Application Priority Data

Apr. 12, 2002 (DE) .......................................... 102 16 376

(51) Int. Cl.[7] .............................................. G01D 21/00
(52) U.S. Cl. ..................................... 73/866.5; 73/865.9
(58) Field of Search .............................. 73/866.5, 865.9; 250/231.13, 231.14, 231.15, 231.16, 231.17

(56) References Cited

U.S. PATENT DOCUMENTS

| | | | | |
|---|---|---|---|---|
| 5,018,397 A | * | 5/1991 | Matich ...................... | 73/866.5 |
| 5,495,758 A | | 3/1996 | Griffen et al. | |
| 5,771,594 A | * | 6/1998 | Feichtinger ................. | 33/1 PT |
| 5,981,940 A | * | 11/1999 | Setbacken et al. ...... | 250/231.13 |
| 6,194,710 B1 | * | 2/2001 | Mitterreiter ............. | 250/231.14 |
| 6,311,402 B1 | * | 11/2001 | Brandl et al. ............... | 33/1 PT |

FOREIGN PATENT DOCUMENTS

DE          10022555 A1    11/2001

* cited by examiner

*Primary Examiner*—C D Garber
(74) *Attorney, Agent, or Firm*—Townsend and Townsend and Crew LLP

(57) ABSTRACT

The invention concerns a rotational angle measuring arrangement for measuring angle dependent units of an encoding shaft which is journaled in a transducer housing. A stator coupling non-rotationally connects the transducer housing to the housing of a drive system that is to be measured, and the encoding shaft and a drive shaft of the drive system are non-rotatably secured to each other. To provide an improved angle measuring system when the stator coupling is positioned between the transducer housing and the drive housing, to prevent angle measurement errors and to facilitate the mounting of the transducer, at least one locking mechanism is provided. When the transducer, including the stator coupling, is detached from the drive housing, the locking mechanism causes the stator coupling to non-rotatably lock the encoding shaft to the transducer housing, and when the stator coupling is secured to the drive system, the locking mechanism permits the encoder shaft to freely rotate.

11 Claims, 4 Drawing Sheets

APPARATUS FOR MEASURING ROTATIONAL ANGLES

The invention relates to an apparatus for measuring the angle of rotation in accordance with the preamble of claim 1.

Instruments for measuring angles, also called rotational transducers or encoders, have a housing for the actual angle sensor and a flange on which a stator coupling connects to the housing of a drive system that is to be measured. A shaft coupling, preferably a fixed coupling such as a threaded connection, connects a shaft of the rotational transducer, also called input shaft or encoder shaft, to a drive shaft that is to be measured.

In addition to the needed mechanical interfaces, the rotational transducer has a scale which carries angular position measurements for detection by a sensor that generates position signals. The signals are sent to a signal and data processing unit and they are transmitted via an electric interface to a control unit such as a motor regulator or control. Such rotational transducers can use optical, magnetic, inductive or potentiometric technologies.

The already mentioned stator coupling provides a non-rotatable or fixed connection between the drive system and the rotational transducer. This involves a rotationally fixed coupling of the housing of the rotational transducer to a housing of the drive system to avoid errors in measuring the angle. Preferably the angle measurement error caused by the stator coupling is less than the measurement accuracy of the rotational transducer.

In addition to the measurement of angles, the stator coupling can also be used to couple instruments for measuring other mechanical values, such as the angular velocity, the angular acceleration or torque. The stator coupling functions as a torque support and permits axial and radial shear movements but not rotational movements.

A variety of stator couplings made of metal as well as other resilient materials are known. DE 89 15 109U and DE 100 22 555 A1 describe couplings with connecting elements that define a parallelogram. For this, four bars which are each offset 90° from each other are arranged on a material with a high degree of fatigue strength. The stator of the drive system and the rotational indicator housing are secured to opposed bars, that is, bars which are offset with respect to each other by 180°.

When space is limited, the installation of such systems is difficult because the individual components, namely the rotational transducer with its encoding shaft, the drive system with its housing (stator) and drive shaft, and the stator coupling, must be connected to each other. DE 32 06 875 A1 and DE 33 01 205 A1 describe a stator coupling that is located inside the housing of the rotational indicator. However, such arrangements require a relatively large space.

It is an object of the invention to provide an instrument for measuring angles of rotation which has a stator coupling between the housing of the rotational transducer and the housing of the drive system (drive housing) which prevents angle measurement errors and facilitates the assembly and installation of the rotational transducer on the drive housing.

This object is solved in accordance with the invention with the arrangement set forth in the characterizing portion of claim 1.

In accordance with the invention, the instrument for measuring angles has at least one locking mechanism which non-rotatably connects the encoder shaft and the rotational transducer housing when the rotational transducer and the stator coupling are separated from the drive housing and which frees the encoder shaft when the stator coupling is secured to the drive housing. In this manner, the rotational transducer can be installed on the drive housing by initially threading together the encoding shaft and the drive shaft of the drive system by simply turning the transducer housing because the stator coupling non-rotationally connects the encoding shaft and the transducer housing. Thereafter the stator coupling is secured to the stator of the drive system, which is typically formed by the drive housing. In accordance with the invention, the locking mechanism becomes disengaged and the encoding shaft becomes unlocked. To establish the non-rotational shaft connection, no special tools are needed for engaging the rotational transducer. The shaft connection can be established by simply grasping the entire transducer housing, which is simpler, faster and therefore less costly. In effect, the housing of the rotational transducer forms the tool for connecting the shafts. Additional advantages attained with the present invention are that while connecting the shafts a rotationally fixed stator coupling is provided. Beyond that, the apparatus for measuring rotational angles constructed in accordance with the invention, and in particular the stator coupling, require little space. A problem-free and very precise transmission of the angle is possible, while relative longitudinal and transverse movements of the housings connected by the stator coupling are compensated for.

This arrangement is especially advantageous for small rotational transducers which require installation in limited spaces. By prestressing the stator coupling prior to its installation, the invention provides the additional advantage of a higher resonance frequency for the coupling cooperating with the rotational transducer.

In a further development of the invention, the locking mechanism is defined by a noncircular shoulder on the encoding shaft, which, for locking, extends into a corresponding cut-out of the stator coupling. The lock is engaged by simply extending the shoulder of the encoding shaft into the cut-out. The encoder shaft can be separated equally simply by pulling the stator coupling from the encoding shaft.

The stator coupling preferably has a mounting plate which forms the cut-out and which is preferably connected to a torque support. The mounting plate serves to secure the stator coupling to the stator of a drive system, that is, the drive housing. The torque support is secured to the mounting plate and the housing of the rotational transducer. Securing the mounting plate to the drive housing causes the mounting plate to be pulled off the noncircular shoulder of the encoding shaft, which permits the latter to rotate. This requires a deformation of some regions of the torque support. Consequently, the torque support is preferably made of spring elastic material and defines a radially and axially resilient mechanical connection of the transducer housing and the drive housing.

By providing the torque support with at least one tensioning element, which secures the mounting plate to the rotational transducer when the latter is not installed, and which is deformable against the tension force when the mounting plate is installed on the drive housing, the tensioning element, and not the actual torque support, becomes deformed. This is particularly advantageous because the torque support is constructed to adapt it to the encountered conditions. The torque support is therefore preferably made in the form of a spring parallelogram. For this purpose, two bars are arranged opposite each other and offset by 180° on a connecting spring sheet. The bars include connecting elements for connection to the mounting plate and therewith to the drive housing. Two further bars, which are offset with respect to the former by 90° each, form a rotationally fixed connection of the transducer housing.

The stator coupling is constructed as a resilient connecting element which has a frequency at which it resonates. To avoid this condition, the resonance frequency should be as high as possible so that the rotational speeds encountered during use of the instrument lie below the resonance frequency. If D is the spring constant of the stator coupling and J the moment of inertia, the resonance frequency f is given as $$f = \frac{1}{2\pi}\sqrt{\frac{D}{J}}.$$

To render the deformation reversible and permit repeated installation of the rotational transducer and the stator coupling, the torque support is made from a spring elastic material, for example spring steel or rubber. The mounting plate is therewith movable in the axial direction.

In a simple embodiment of the invention, the mounting plate is threadably connected to the drive housing.

To facilitate the turning of the transducer housing during installation, it is preferable to form its exterior so that it can be grasped with a tool for turning the transducer housing and to thereby thread the encoding shaft onto the drive shaft.

A further development of the invention prevents the transmission of the entire torque through the torque support when turning the transducer housing during installation. This is effected by providing at least one shoulder on the end of the transducer housing facing the stator coupling and which extends into the cut-out. As a result, the transducer housing and the mounting plate are non-rotatable with respect to each other while the transducer is installed on the drive housing.

To assure that the shafts are securely connected to each other, the ends of the encoding shaft and the drive shaft have respective inner and outer cones.

In the following, the invention is explained with reference to the drawings. The drawings show:

Figure 1:
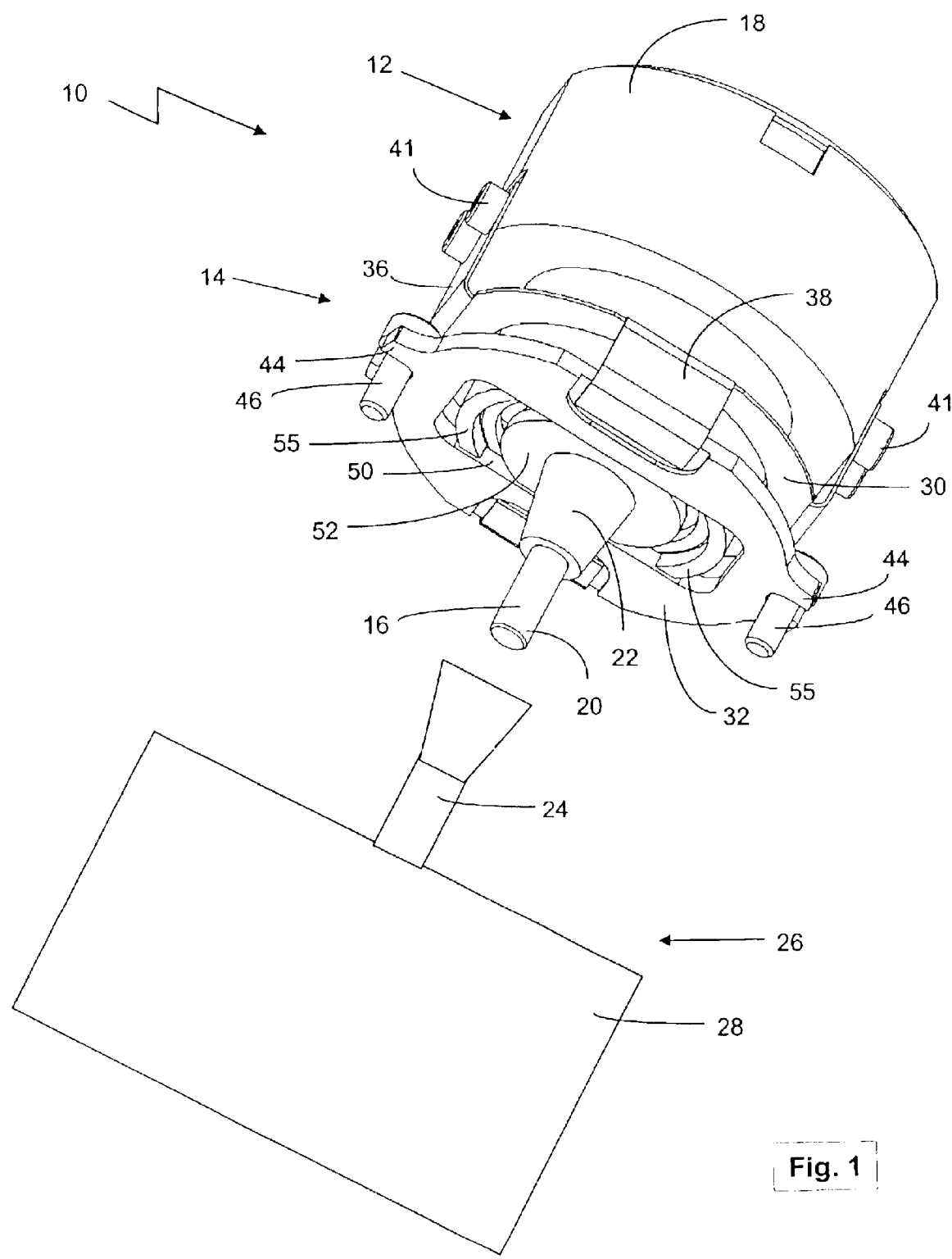
FIG. 1 is a perspective view of an apparatus for measuring angles of rotation with a stator coupling constructed in accordance with the invention.

FIG. 1 shows an apparatus 10 for measuring angles of rotation which has a rotational transducer or rotor 12 and a stator coupling 14. The transducer includes an encoding shaft 16 which is journaled in a transducer housing 18. In the transducer housing 18 are the needed components for determining the angle of encoding shaft 16, such as a measurement unit, a scanning unit, electronics and the like. A thread 20 and an external cone 22 are at the end of encoding shaft 16 for non-rotatably connecting the encoding shaft with an only schematically illustrated drive shaft 24 of a drive system 26. Shaft 24 includes an internal cone that corresponds to the external cone 22. Drive system 26 includes a drive housing 28 in which drive shaft 24 is journaled and which includes needed drive electronics.

For measuring the rotation of drive shaft 24, the encoding shaft 16 must be coupled to drive shaft 24, and transducer housing 18 must be connected to housing 28. This is accomplished with stator coupling 14, and its construction and function are described in greater detail below.

Figure 2:
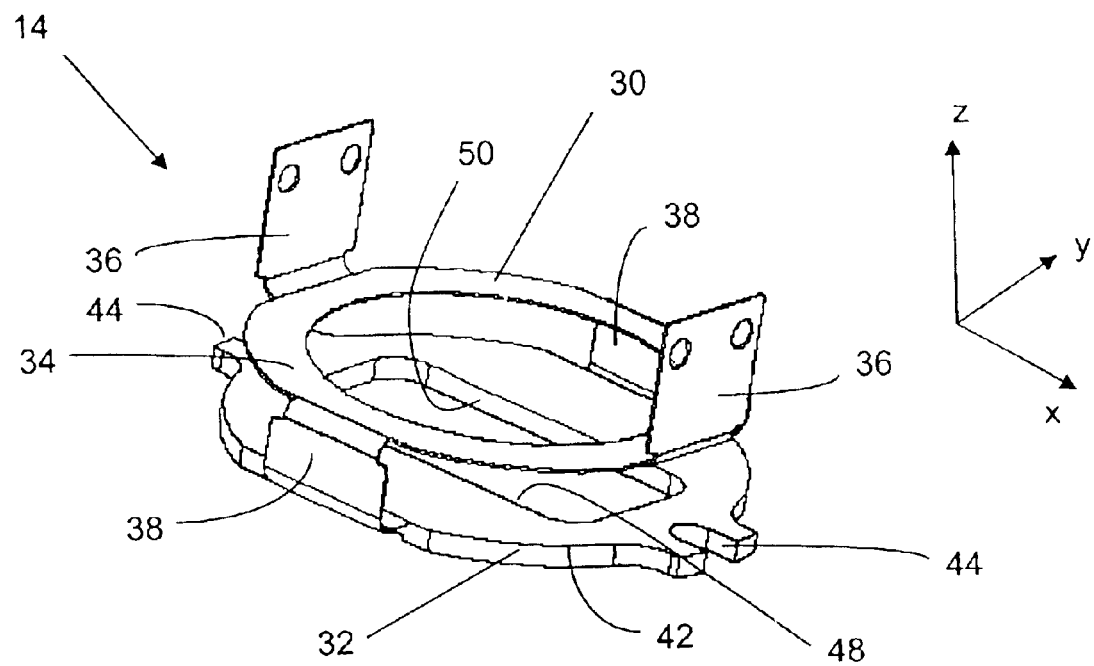
FIG. 2 shows the stator coupling of FIG. 1.

Referring to FIG. 2, the illustrated stator coupling 22 has a torque support 30 and a mounting plate 32. Torque support 30 resists the torque that is generated when measuring the rotation or angular position of drive shaft 24. Torque support 30 is fixed to transducer housing 18 and mounting plate 32 so that stator coupling 14 secures the transducer housing 18 to drive housing 28.

Figure 3:
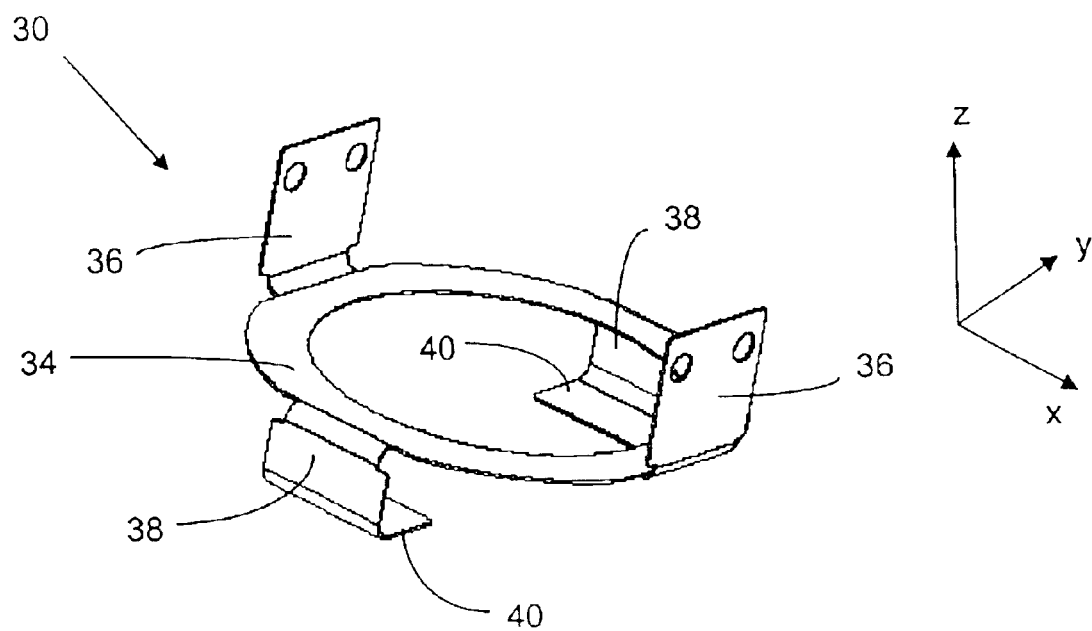
FIG. 3 shows the torque support of the stator coupling in FIG. 1.

A first embodiment of the torque support 30 separately shown in FIG. 3 is of a one-piece stamped and bent construction. Torque support 30 is made from a material having high-fatigue strength such as spring steel, for example.

It is advantageous to generally configure torque support 30 as a parallelogram. When viewed in a Cartesian coordinate system as illustrated in FIG. 3, a center region 34 of the torque support lies in the xy-plane. The z-axis is perpendicular thereto and extends in the direction of encoding shaft 16. There are two first bending beams or tabs 36 for connection to transducer housing 16 in the center region 34 which extend in the positive z-direction. If desired, the bending beams 36 can also extend in the opposite, negative z-direction, and they are arranged on the center region 34 at diametrically opposed locations.

Two second bending beams 38 are offset 90°, arranged on center region 34 for connection to mounting plate 32, and they extend in the opposite z-direction. This results in a spring parallelogram which in a particularly advantageous manner provides an angularly correct connection of transducer 12 to the drive system that is to be measured. FIG. 3 shows the second bending beams bent in the negative z-direction.

In addition, ends 40 of the second bending beams 38 are bent in the y-direction. They can be bent inwardly, as shown in FIG. 3, or alternatively they can be bent to the outside.

The bent ends 40 of the second bending beams are connected to mounting plate 32, in the illustrated embodiment they are welded thereto. The free ends of the first bending beams 36 connect the torque support 30 to transducer housing 18, for example with the help of threaded bolts 41. They can be connected in other ways such as with screws, by welding, clamping, riveting or with similar connection technologies.

In this embodiment, mounting plate 32 principally comprises a flat base plate 42 which includes on its periphery protruding projections 44 for supporting connecting elements, such as screws 46. Screws 46 secure mounting plate 32 to drive housing 28.

At its center, mounting plate 32 includes a center cut-out 48, which, in the embodiment shown in FIGS. 1 and 2, has an approximately rectangular shape with longitudinal sides 50.

Encoding shaft 16 includes a noncircular shoulder 52 which fits into center cut-out 48 so that shoulder 52 contacts longitudinal sides 50. As a result, encoding shaft 16 is non-rotatable relative to mounting plate 32 and therewith relative to stator coupling 14.

The function and operation of stator coupling 14 will be apparent from the step-by-step description for mounting transducer 12.

Initially, stator coupling 14 is attached to transducer 12 so that shoulder 52 of encoding shaft 16 extends into center cut-out 48 in mounting plate 32. Transducer housing 18, encoding shaft 16 and stator coupling 14 with mounting plate 32 form a non-rotatable unit, as can be seen in FIG. 1. Thread 20 of encoding shaft 16 is next threaded onto drive shaft 24 of drive system 26 by turning the transducer housing 18 and therewith the encoding shaft 16. To facilitate the rotation of transducer 12, the exterior of transducer housing 18 can be formed so that it can be grasped with a tool, for example a wrench. It can additionally be advantageous to form portions 55 of transducer housing 18 so that they too can extend into the center cut-out. In this manner, torque support 30 non-rotatably secures transducer housing 18 directly, and not just indirectly, relative to mounting plate 32. This permits the application of a greater torque for tightening encoder shaft 16 without the danger of deforming the torque support.

After encoding shaft 16 has been coupled to drive shaft 24, screws 46 are used for securing mounting plate 32 to drive housing 28. Shafts 16 and 20 are dimensioned and formed so that as the mounting plate 32 is secured it moves in an axial direction towards the drive housing over a distance equal to at least the thickness of the mounting plate. This results in a tensioning of torque support 30 and a bending of the individual bending beams 36 and 38 as well as the center region 34 out of their rest positions. Due to the movement of mounting plate 32 in the axial direction, it becomes disengaged from shoulder 52 of encoding shaft 16, which releases the non-rotatable connection of the encoding shaft. The apparatus for measuring the angle of rotation 10 is therewith assembled and ready for use.

Figure 4:
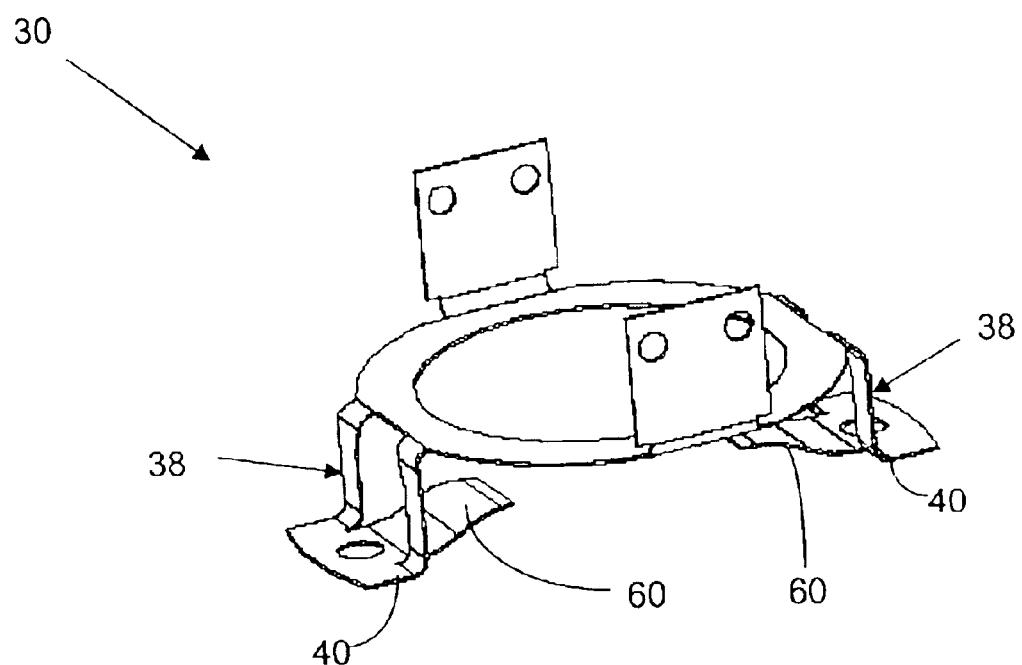
FIGS. 4 and 5 illustrate other embodiments of the torque support.
Figure 5:
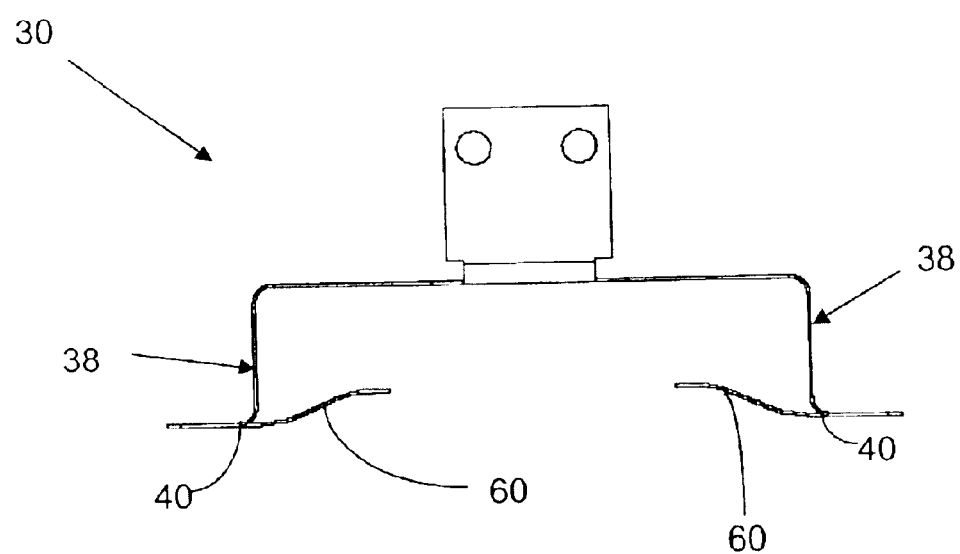
Figure 6:
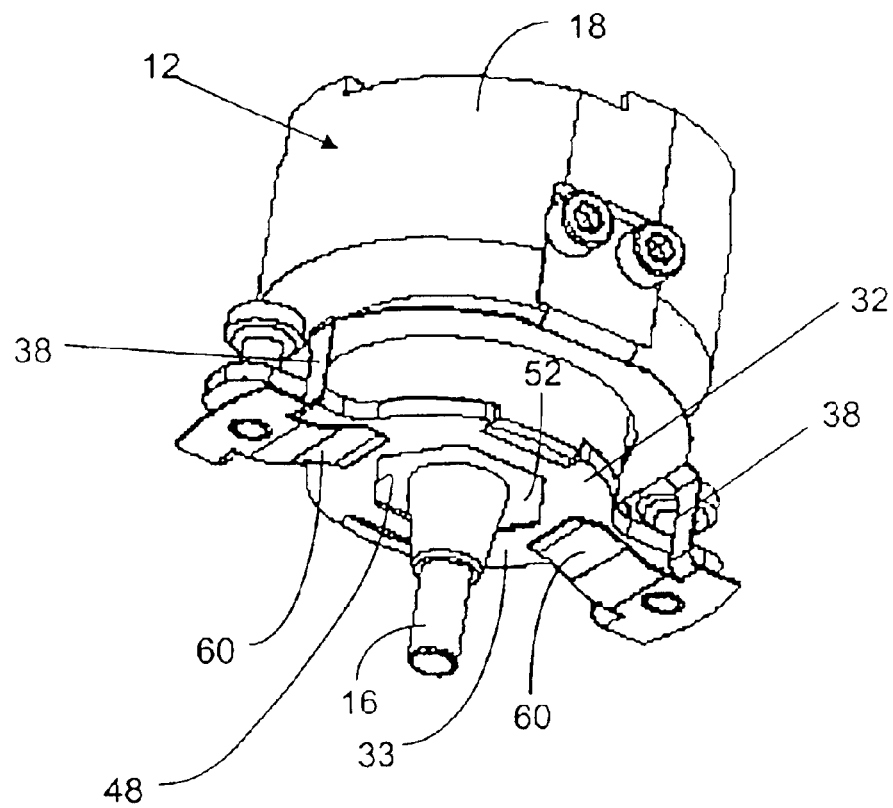
FIGS. 6 and 7 show an embodiment of an apparatus for measuring angles of rotation in accordance with the invention with a stator coupling and a torque support according to FIG. 4.
Figure 7:
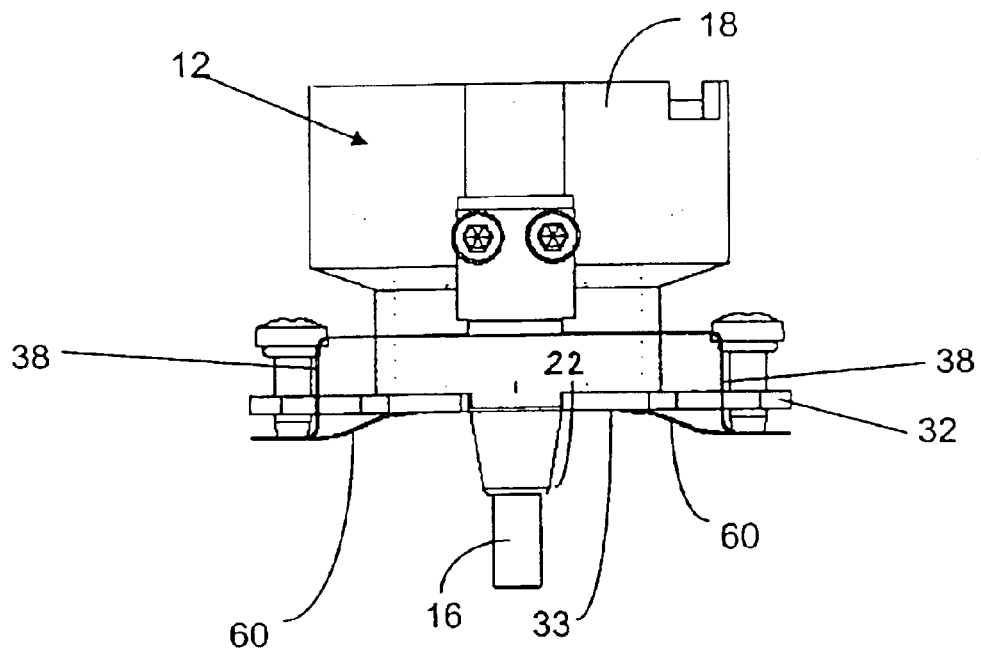

In a further embodiment of the invention, torque support 30 is formed as is illustrated in FIGS. 4 and 5. Like parts have the same reference numerals. In distinction to the torque support shown in FIG. 3, the ends 40 of the second bending beams 38 are not welded or otherwise fixedly attached to mounting plate 32. Instead, each end 40 carries a tensioning element, for example a flat spring 60, which is preferably of a unitary, one-piece construction with torque support 30 and which is arranged on side 33 of mounting plate 30 facing away from transducer housing 18, as can be seen in FIGS. 6 and 7. Flat springs 30 pretension the stator coupling so that the mounting plate 30 is pretensioned and non-rotatable relative to transducer housing 18 when it is not mounted and when shoulder 52 of encoding shaft 16 is received in center cut-out 48 of mounting plate 32.

The illustrated embodiment (FIG. 6) also shows that shoulder 6 can have a different form. For example, it can have a hexagonal shape and is received in a correspondingly shaped cut-out 48 of mounting plate 32.

An advantage of this embodiment is that upon attachment of mounting plate 32 to the drive housing, the torque applied to portions of torque support 30 during operation of transducer 12 are not bent or deformed. Instead, flat springs 60 are merely pressed flat. This permits a better calculation of the characteristics of torque support 30 and allows it to be better adapted to the particular application.

What is claimed is:

1. Apparatus for measuring rotational angles of angle-dependent measurement values comprising a transducer (12) having an encoding shaft (16) which is journaled in a transducer housing (18), a stator coupling (14) for forming a rotationally fixed connection between the transducer housing (18) and a drive housing (28) of a drive system that is to be measured, the encoding shaft (16) being adapted to be non-rotatably connected to a drive shaft (24) of the drive system that is to be measured, wherein the drive shaft (24) has an axis of rotation that substantially coincides with an axis of rotation of the encoding shaft (16) of the transducer (12), at least one locking mechanism (52) including a noncircular shoulder (52) on the encoding shaft (16) which engages a cut-out (48) in the stator coupling (14) to effect the locking, the stator coupling (14) having a mounting plate (32) for mounting the stator coupling (14) on the drive system (26) and which defines the cut-out (48), the stator coupling further including a torque support (30) connected to the mounting plate (32) which is nonmovably attachable to the transducer housing (18) and the mounting plate (32), wherein the locking mechanism, while the transducer (12) and the stator coupling (14) are separate from the drive housing (28), non-rotatably connects the encoding shaft (16) via the stator coupling (14) with the transducer housing (18) and which, when the stator coupling (14) is secured to the drive system (26), releases the encoding shaft.

2. An angular measuring system in accordance with claim 1, wherein the torque support (30) is formed in the manner of a spring parallelogram.

3. Apparatus according to claim 1, wherein the mounting plate (32) can be threadably secured to the drive housing (28).

4. Apparatus according to claim 1, wherein the transducer housing (18) has a peripheral contour (54) for grasping with a tool with which the transducer (12) can be rotated for threadably connecting the encoding shaft (16) and the drive shaft (24).

5. Apparatus according to claim 1, wherein an end of the transducer housing (18) facing the stator coupling (14) includes at least one portion (55) which is extendable into the cut-out (48) so that the transducer housing (18) and the mounting plate (32) for mounting the transducer (12) on the drive system (26) are non-rotatably connected to each other.

6. Apparatus according to claim 1, wherein ends of the encoding shaft (16) and the drive shaft include internal and external cones (22) for connecting the shafts.

7. Apparatus for measuring rotational angles of angle-dependent measurement values comprising a transducer (12) having an encoding shaft (16) which is journaled in a transducer housing (18), a stator coupling (14) for forming a rotationally fixed connection between the transducer housing (18) and a drive housing (28) of a drive system that is to be measured, the encoding shaft (16) being adapted to be non-rotatably connected to a drive shaft (24) of the drive system that is to be measured, wherein the drive shaft (24) has an axis of rotation that substantially coincides with an axis of rotation of the encoding shaft (16) of the transducer (12), at least one locking mechanism (52) which, while the transducer (12) and the stator coupling (14) are separate from drive housing (28), non-rotatably connects the encoding shaft (16) via the stator coupling (14) with the transducer housing (18) and which, when the stator coupling (14) is secured to the drive system (26), releases the encoding shaft, the locking mechanism (52) including a noncircular shoulder (52) on the encoding shaft (16) which engages a cut-out (48) in a mounting plate of the stator coupling (14) to effect the locking, the transducer housing (18) facing the stator coupling (14) including at least one portion (55) which is extendable into the cut-out (48) so that the transducer housing (18) and the mounting plate (32) for mounting the transducer (12) on the drive system (26) are non-rotatably connected to each other.

8. Apparatus according to claim 7 wherein the stator coupling (14) includes a torque support (30) connected to the mounting plate (32) which is nonmovably attachable to the transducer housing (18) and the mounting plate (32).

9. Apparatus according to claim 1 wherein the torque support includes at least one tensioning element (60) which, when the transducer (12) is not mounted, secures the mounting plate (32) on the transducer (12) which, for attaching the mounting plate (32) to the drive housing (28), is deformable in opposition to its tensioning force.

10. Apparatus according to claim 1 wherein the torque support (30) is constructed of a spring elastic material, such as spring steel, so that when the torque support (30) is attached to the transducer housing (18) the mounting plate (32) is movable in an axial direction.

11. Apparatus for measuring rotational angles of angle-dependent measurement values comprising a transducer (12) having an encoding shaft (16) which is journaled in a transducer housing (18), a stator coupling (14) for forming a rotationally fixed connection between the transducer housing (18) and a drive housing (28) of a drive system that is to be measured, the stator coupling (14) including a mounting plate (32) for mounting the stator coupling (14) on the drive system (26) and a torque support (30) connected to the mounting plate (32) which is nonmovably attachable to the transducer housing (18) and the mounting plate (32), the encoding shaft (16) being adapted to be non-rotatably connected to a drive shaft (24) of the drive system that is to be measured, wherein the drive shaft (24) has an axis of rotation that substantially coincides with an axis of rotation of the encoding shaft (16) of the transducer (12), and at least one locking mechanism (52) which, while the transducer (12) and the stator coupling (14) are separate from drive housing (28), non-rotatably connects the encoding shaft (16) via the stator coupling (14) with the transducer housing (18) and which, when the stator coupling (14) is secured to the drive system (26), releases the encoding shaft.

* * * * *